Dec. 22, 1942.   E. A. MEYER   2,306,074
FILTRATION APPARATUS
Filed June 11, 1940
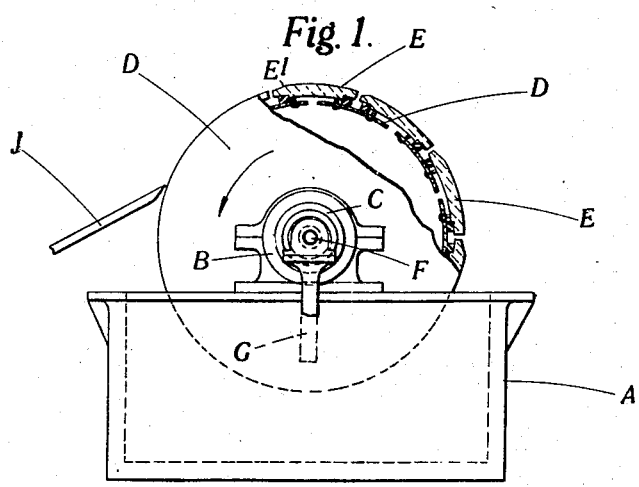
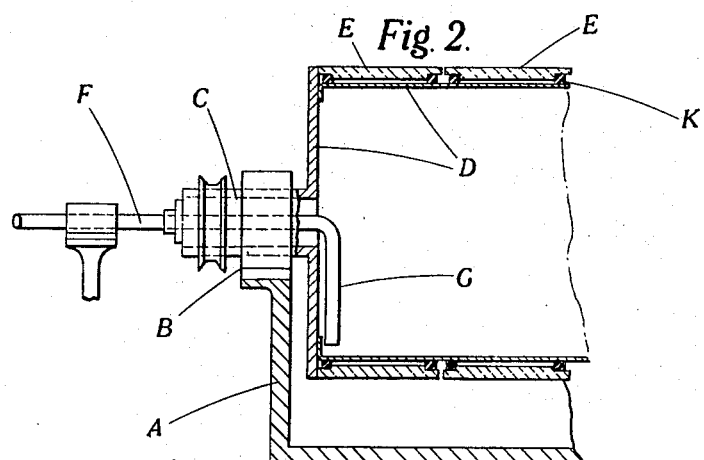
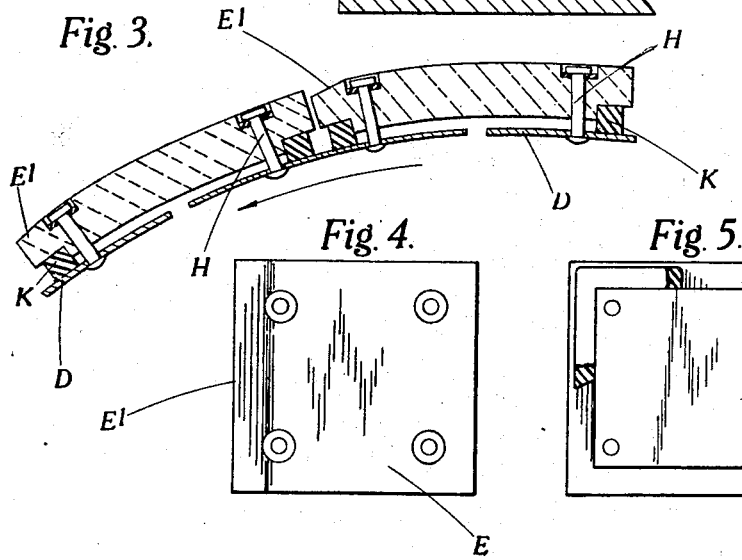
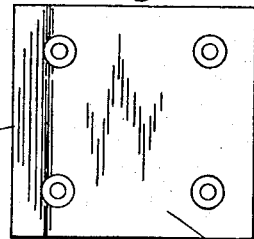
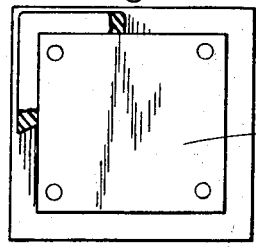
Inventor
Ejnar A. Meyer
by Watson Bristol, Johnson Leavenworth
Attorneys Patented Dec. 22, 1942

2,306,074

UNITED STATES PATENT OFFICE 2,306,074

FILTRATION APPARATUS

Ejnar Alfred Meyer, Epsom, England, assignor to Standard Brands Incorporated, New York, N. Y., a company of Delaware Application June 11, 1940, Serial No. 339,866
In Great Britain June 23, 1939

5 Claims. (Cl. 210—201)

This invention relates to filtration apparatus and has particular but not exclusive reference to apparatus for the filtration of liquor containing yeast in suspension. As is well known the separation of yeast from yeast-containing liquor requires careful consideration in the sense that it is the yeast rather than the liquid that is the desired product, the bulk of the yeast relative to the total mass treated is relatively large, and the filtering apparatus must be bacteriologically clean and be easily cleansed and sterilized, and the filter pores must be appropriately related in size to the particle size of the yeast. It is known to use for the purpose a hollow rotary metal drum perforated and covered with filter cloth and partly immersed in a horizontal position in a tank containing the liquor to be filtered and to maintain a partial vacuum inside the drum while removing continuously from the drum surface, by means of a knife or the like, the yeast being continuously attracted to the drum surface and accumulating thereon in a partially pressed condition.

The chief object of the present invention is to provide an improved yeast filtering apparatus of the continuously acting hollow rotary drum type referred to.

According to the present invention the cylindrical filtration wall of the rotary drum is composed of somewhat thick naturally porous material of ceramic nature such as the material used for making porous filter and aeration discs. The filtration wall must be composed of a cylindrical assembly of slabs except possibly in the case of small drums in which case a one-piece wall may be used. The slabs of the said assembly are removably mounted upon a skeleton cylindrical drum or similar support, the joints being so arranged as not to interfere with the continuous peripheral removal of the accumulating yeast from the cylindrical surface; for example the edges of the slabs may be slightly chamfered and any holding-on bolts or the like may be housed in recesses counter-sunk in the slab surfaces.

One convenient constructional arrangement of the improved filtering drum comprises a slotted perforated or skeleton cylindrical metal support to which are secured part-cylindrically curved slabs of square or rectangular contour seated on square shaped or rectangular shaped blocks or strips of rubber, each slab being of portable size and easily detachable from the support.

A filter device constructed as above described and rotating partly immersed while being subjected internally to reduce pressure meets the requirements hereinbefore referred to for efficient separation of yeast in a partially pressed condition from yeast-containing liquor in a highly satisfactory manner. The yeast-denuded liquid may be withdrawn from the interior of the drum in any known manner, as for example by a suction pipe extending axially through an end bearing of the drum and reaching down inside the same; the same pipe serves to maintain the necessary reduced pressure inside the drum.

The accompanying drawing illustrates schematically the essential features of one embodiment of the filtering apparatus in accordance with the invention. In the drawing:

Figure 1 is an end view of the apparatus, and Figure 2 is a fragmentary longitudinal sectional elevation at one end of the apparatus;

Figure 3 is an enlarged view of two of the ceramic slabs composing the filter drum surface and the associated parts of the drum;

Figure 4 is a top face view of one of the slabs, and Figure 5 is a corresponding view of the under surface of the slab.

In the drawing A is a tank containing liquor to be filtered and B is a bearing for the hollow shaft C of a skeleton metal rotatable drum D closed at its ends. By the term skeleton is intended to be included any slit or perforated structure. On the cylindrical surface of the metal drum are mounted the ceramic slabs E. A suction pipe F extends into the interior of the drum through the hollow shaft C and an extension G of the pipe F reaches down near to the lowermost part of the drum interior. By this pipe the suction inside the drum is maintained and the filtered liquid is removed.

As clearly seen in Figure 3 the skeleton drum D carries bolts H radiating outwardly and passing through the holes in the ceramic slabs E which are countersunk on their external surface to receive nuts on the bolt ends. The leading edge $E^1$ of each slab may be slightly bevelled so that as the slabs pass under a knife J mounted with its edge near to the ceramic surface the knife edge will not foul the slab edges. The knife J may however be located at an appreciable distance from the drum surface so that a film of solid remains on said surface. Each slab is seated on blocks K of rubber or other suitable material to give a resilient seating and to enable each slab to be tightened down to the requisite degree to produce a true cylindrical surface. The slabs are arranged with slight clearance between one another as shown in Figure 3.

What I claim is:

1. Filtration apparatus for effecting continuous filtration by suction through a permeable wall, said apparatus comprising essentially a drum having a cylindrical filtration wall composed of an assembly of porous ceramic slabs having chamfered forward edges against which the material to be filtered makes contact, a skeleton upon which said slabs are seated, a tank on which the drum is supported for rotation about a horizontal axis in a partially submerged position, means for maintaining a partial vacuum in the interior of the drum, and a knife for continuously removing from said surface solid matter as it accumulates thereon.

2. Filtration apparatus for effecting continuous filtration by suction through a permeable wall, said apparatus comprising essentially a drum composed of a skeleton metal cylinder and an assembly of porous ceramic slabs having chamfered forward edges enveloping the cylindrical wall thereof and seated upon said skeleton, means detachably securing said slabs to said skeleton drum, a tank on which the drum is supported for rotation about a horizontal axis in a partially submerged position, means for maintaining a partial vacuum in the interior of the drum, and a knife for continuously removing from said surface solid matter as it accumulates thereon.

3. Filtration apparatus for effecting continuous filtration by suction through a permeable wall, said apparatus comprising essentially a drum having its cylindrical filtration wall composed of porous ceramic material having a chamfered forward edge against which the material to be treated makes contact, a skeleton upon which said ceramic material is seated, a tank on which the drum is supported for rotation about a horizontal axis in a partially submerged position, means for maintaining a partial vacuum in the interior of the drum, and a knife for continuously removing from said surface solid matter as it accumulates thereon.

4. Filtration apparatus according to claim 1, including a resilient seat between each slab of the cylindrical filtration wall and the skeleton.

5. Filtration apparatus according to claim 2, including means positioned in a countersunk manner in the cylindrical filtration wall and affixed to the metal cylinder thereby serving to hold down the slabs of said wall onto the skeleton metal cylinder.

EJNAR ALFRED MEYER.